Jan. 13, 1942.  F. LEWIN  2,269,723
PHOTOGRAPHIC EXPOSURE METER
Original Filed May 9, 1938
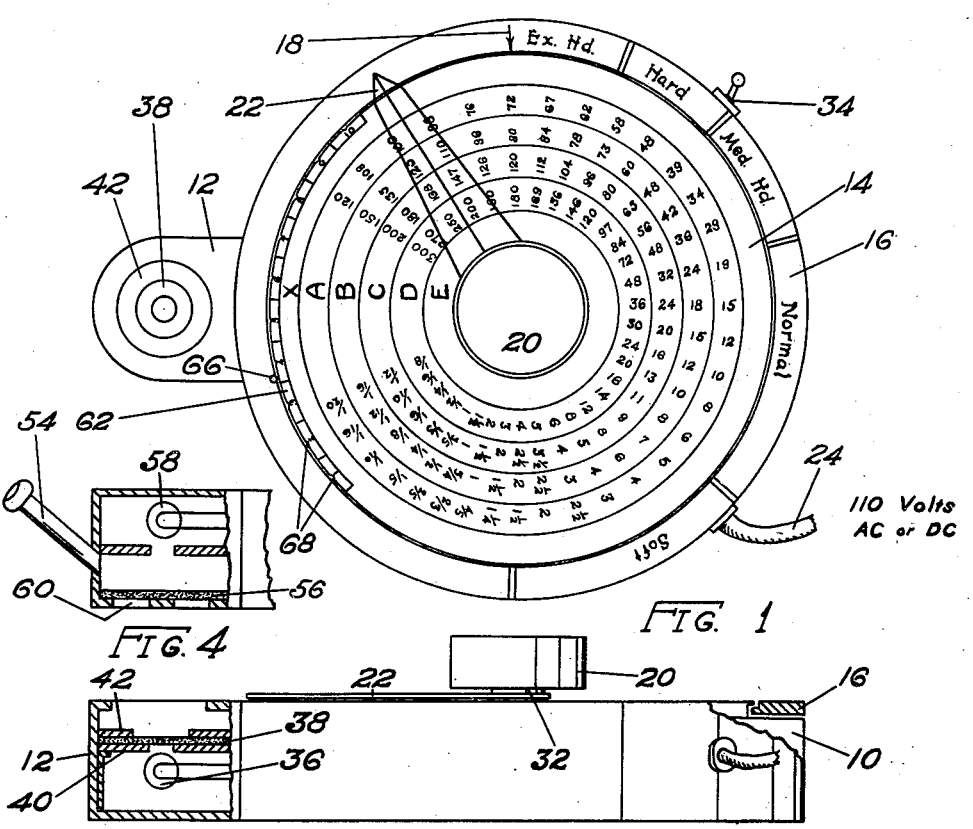
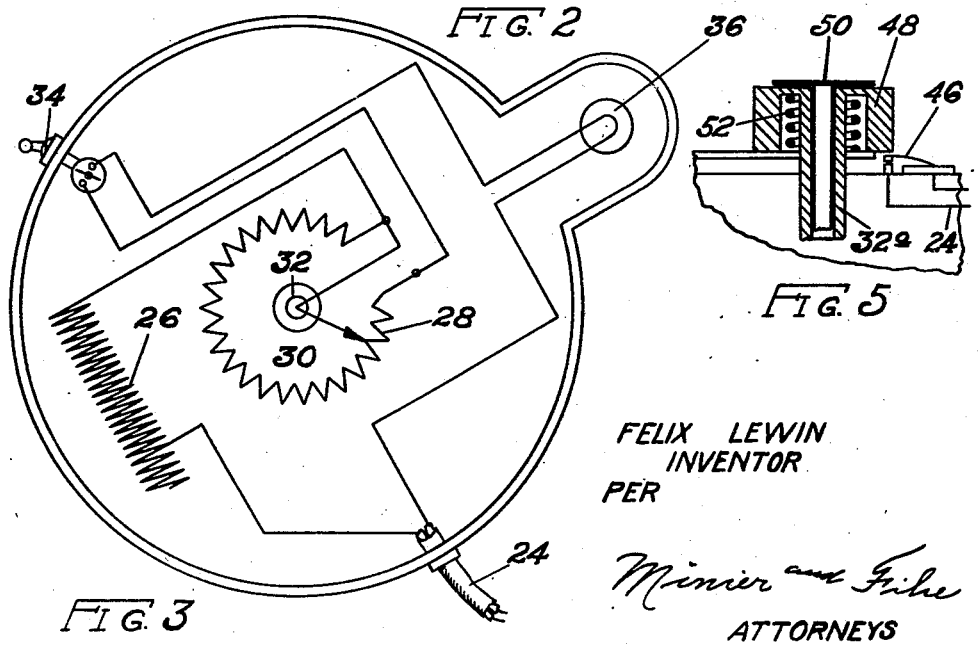
FELIX LEWIN
INVENTOR
PER
ATTORNEYS Patented Jan. 13, 1942

2,269,723

UNITED STATES PATENT OFFICE 2,269,723

PHOTOGRAPHIC EXPOSURE METER

Felix Lewin, Los Angeles, Calif., assignor to Research Engineering Company, Chicago, Ill., a corporation of Illinois Application May 9, 1938, Serial No. 206,789
Renewed July 24, 1940

8 Claims. (Cl. 88—23)

This invention relates to an improved photographic exposure meter and has, for one of its principal objects, the provision of a simple yet efficient means for determination of the proper period of exposure of sensitized paper in photographic printing, either in conjunction with an enlarging process or for contact printing.

One of the important objects of this invention is to provide an exposure meter for use by either professionals or amateurs in the photographic art, which will eliminate any guesswork or even ordinary judgment on the part of the operator, and thereby dispense with a considerable amount of waste of expensive paper which ordinarily occurs.

A still further object of the invention is to provide means in a device of the class described whereby the same can be used for either enlarging or contact printing with a slight modification.

A still further important object is to provide a calibrated light means in the exposure meter of this invention, which shall be relatively fixed so as to be adapted by the manufacturer for different current sometimes encountered in various localities, and at the same time, there is also included a very simple rheostat or resistance means which is adjusted by the operator to vary the intensity of the calibrated light.

A further object is to provide an easily read scale and one which will be practically automatic in its operation so far as indicating the proper exposure time for any particular type of paper.

Other and further important objects will be apparent from the accompanying drawing and following specification.

The invention, in a preferred form, is shown in the drawing and hereinafter more fully described.

In the drawing:

Figure 1 is a top plan view of the improved photographic exposure meter of this invention, showing most of the operating parts.

Figure 2 is a side elevation of the same, parts being broken away to show certain interior construction.

Figure 3 is an interior view showing more or less diagrammatically the electrical connections.

Figure 4 is a modification illustrating the device as adapted to be used for contact printing.

Figure 5 shows another modification illustrating a slightly different type of switch means for the source of illumination.

As shown in the drawing:

The reference numeral 10 indicates generally the casing of the improved photographic exposure meter of this invention, the same comprising an approximate flattened cylinder which, however may be of some other shape and which includes an extension 12 connected thereto in any suitable manner and forming a part thereof.

The case 10 is provided with a circular cover 14, movable through a restricted arc. Also circular and mounted in the cover and around the periphery thereof is a relatively fully movable ring 16 having certain indicia thereon for describing the various types of photographic printing paper now in use; as, for example, the notation "Ex. Hd." indicates extra hard paper, and the other words "Hard," "Medium," "Normal" and "Soft" are self-evident. This outer ring is also provided with an arrow at one point in its periphery as shown at 18.

Surmounting the cover 14 and located centrally thereof is a knob 20 provided with a pointer 22, the pointer being adapted for rotation over the area of the circular cover 14 and the relatively movable ring 16.

The cover 14 is provided with concentric rings designated by the reference letters "X," "A," "B," "C," "D" and "E," and in each ring is imprinted a series of numbers to indicate the particular exposure time preferably in seconds after the same has been automatically ascertained by use of the instrument.

A pair of wires 24 leading in from a source of current is provided and one wire is connected to a rheostat 26, this being the means for calibrating the instrument, and such calibration is accomplished by the manufacturer in order to provide for current variations which may occur over different localities. This particular calibration is ordinarily not to be disturbed.

The wires then lead to a circular rheostat element 28 which is provided with a contact member 30 operated from the shaft 32 of the knob 20, and a master switch 34 is provided on the outer circumference of the casing. The wires then lead to a lamp globe 36 which is preferably one for small voltages, as, for example, a 3.2 volt flashlight bulb, and the resistances 26 and 28 are so calculated as to reduce the usual 110 volt alternating or direct current to a pressure which will satisfactorily operate the bulb 36.

As best shown in Figure 2, the bulb is positioned beneath a transparent sheet of material 38, and beneath this material is an opaque plate 40 having a circular opening in the center thereof, and above the sheet 38 is another opaque plate 42 also having a circular opening in the center thereof, the opening in the plate 42 being of a greater diameter than the opening in the plate 40, all openings being concentric and as closely as possible directly above the source of illumination.

In order to avoid the possibility of erroneous readings, because of variations in the color of the light supplied by the flashlight bulb under changes in temperature, the area under the spot formed by the opening in the member 42 is provided with a translucent diffusing surface as indicated in the transparent sheet 38 in order that the illumination from the bulb 36 be uniformly distributed over the entire surface thereof. The device can be made still more accurate by means of the numbered scale 62 of Figure 1 which is on the cover 14 and which operates in conjunction with an immovable pointer 66, the end of which extends upwardly between the cover 14 and ring 16 and acts in any one of a series of notches 68 formed in the periphery of the combination cover and scale member 14, this element being movable within a restricted arc of about 90 degrees. The indicia carried within this arc of movement designate the particular make of the paper which the operator desires to use and coincide with a separate code list furnished with the instrument and in which the names of manufacturers are assigned numbers.

In operation, the enlarging projector having been prepared, the negative is placed in position and the diaphragm focus properly adjusted, the instrument having first been set for the make of paper to be used, by revolving inside dial until the number corresponding thereto, is opposite the pointer 66 and rests within the notch, is then placed upon the easel in such a position that the illumination from enlarging light passing through the strongest highlight of the negative falls on the comparison plate 42—38—40. The knob 20 is then adjusted until the illuminated area matches in color the adjacent area 40 seen through the translucent material 38, the shade being distinctly lighter if the illumination from the instrument is too strong and distinctly darker if the illumination from the enlarger is too strong. When the proper point of adjustment is reached, the ring 16 is revolved until the arrow 18 thereon coincides exactly in position with the pointer 22. The instrument is then moved on the easel until the illumination from the deepest shadow in the negative falls upon the comparison area in the manner described above, and the adjusting knob is then again varied until a point of balance is reached in the illuminated comparison plate. The pointer 22 will then automatically indicate on the ring 16 the grade of paper to be used for that particular negative.

The figures in the concentric circles on the cover 14 are so calibrated that when the two adjustments given above are made the concentric circles designating the speed of the paper will be directly under the center line of pointer, give the exact time of exposure for development in the proper chemical solution of 90 seconds or such other lengths of developing time as the operator may prefer by reason of temperature or chemical composition of the developing solution.

The five scales marked A to E inclusive give the exposures for the five grades of paper covered by the revolving ring 16. Thus, if a soft grade of paper is indicated, scale "A" is used. If an extra hard grade of paper is indicated, scale "E" is used.

The concentric scale marked "X" is calibrated arbitrarily in units of illumination intensity, and instructions for its use by professionals and advanced amateurs can be supplied with the instrument.

For grades of paper varying in speed from those accepted as standard in the calibration of the instrument, a set of speed tables of other grades accompanies the instrument, which indicates what adjustment in the exposure shown should be made for extra fast or extra slow papers.

For reclassification of papers which have changed in speed or exposure ratio due to age, climatic conditions or the like, a simple modification will indicate to the user the exact classification of such out of the ordinary papers.

The toggle type of switch 34 may be changed to a contact switch as indicated at 46 in Figure 5, this being operated by a simple downward pressure of the knob 48 which is held in position by means of a fixed stem 50 and normally maintained in upward position by means of the helical spring 52. This knob operates on a spindle 32a similar to the spindle 32 of Figure 2.

When the device is used for contact printing, the modification shown in Figure 4 is employed, this including an eye-piece 54 directed onto a translucent pane of material 56, the central portion of which is illuminated by the bulb 58 and surrounded by an opening 60 through which a visual comparison with the particular negative may be made.

It will be evident that herein is provided an instrument which, if even carelessly used, will indicate exposures so nearly correct that slight errors can be readily compensated for by varying the time of development slightly, thus giving acceptable prints without resorting to test strips, forcing or other expedients. The instructions also provide for the making of under-scale or over-scale prints, and by taking two readings of a negative requiring dodging or burning-in, the exact procedure required is clearly indicated to the user. In use, it has been found that the instrument registers differences in illumination requiring as little as one-half second change in exposure, and, furthermore, bromide papers exposed for a calculated time as determined by the instrument, will invariably develop to the proper point in exactly ninety seconds when used with developers compounded under the instructions of the manufacturer of the particular paper.

I am aware that many changes may be made and numerous details of construction varied through a wide range without departing from the principles of this invention.

I claim as my invention:

1. A photographic exposure meter, comprising a casing, a projection therefor comprising a housing, a source of illumination in the housing, a visual reflected and transmitted light comparison means in the housing adjacent the source of illumination, means for varying the intensity of the illumination, said means comprising a rheostat in the casing, a knob for operating the rheostat, and a pointer connected to the knob, together with a calibrated scale on the cover of the casing over which the pointer is adapted to travel, the scale including a rotatable ring also forming part of the cover and having indicia thereon corresponding to various grades of photographic printing papers.

2. A photographic exposure meter, comprising a casing, a projection therefor comprising a housing, a circular cover therefor, said cover movable about its center through a limited arc, a source of illumination in the housing, and a visual reflected and transmitted light comparison means in the housing adjacent the source of illumination, means for varying the intensity of the illumination, said means comprising a rheostat in the casing, a knob for operating the rheostat, a pointer connected to the knob, together with a calibrated scale on the cover of the casing over which the pointer is adapted to travel, the scale including a rotatable ring mounted in the periphery of the cover, said ring divided into sectors, each sector indicating a grade of photo print paper.

3. A photographic exposure meter, comprising a casing, a projection therefor comprising a housing, a source of illumination in the housing, a visual reflected and transmitted light comparison means in the housing adjacent the source of illumination, said means comprising a glass pane, light diffusing elements in the glass, and means for varying the intensity of the illumination, said means comprising a rheostat in the casing, a knob for operating the rheostat, a pointer connected to the knob, a calibrated scale on the cover of the casing over which the pointer is adapted to travel, the scale including a rotatable ring having further calibrated indicia thereon and mounted in the periphery of the cover, a further scale on the periphery of the cover, a pin associated with said last named scale and notches on the adjacent portion of the cover for co-operation with the pin.

4. A photographic exposure meter, comprising a casing, a source of illumination in the casing, a combined visual reflected and transmitted light comparison field in the casing and directly above the source of illumination, said light comparison field including a translucent plate, means for varying the amount of illumination reaching the under-face of the plate, a knob rotatably mounted in the casing for operating said illumination varying means, a pair of ringlike calibrated scales on the outer cover of the casing concentric with the knob and cooperating therewith, one of said scales graduated in time units and movable with respect to the other, and the other scale graduated in terms of photographic paper speed, whereby manipulation of the knob and cooperating scales will automatically indicate the exposure time for paper of a given speed.

5. A photographic exposure meter, comprising a casing, a source of illumination in the casing, a combined visual reflected and transmitted light comparison field in the casing and directly above the source of illumination, said light comparison field including a translucent plate, means for varying the amount of illumination reaching the under-face of the plate, said means including a knob rotatably mounted in the casing at a point removed from the comparison field, a pair of ring-like calibrated scales on the outer cover of the casing concentric with the knob and cooperating therewith, one of said scales movable with respect to the other and with respect to the casing, the graduations on one of said scales being in logarithmic progression, whereby placing the comparison field of the meter in an area of greatest light of a projected image from a negative, adjusting the knob until the spot in the comparison field disappears, then placing the comparison field of the meter in an area of deepest shadow of the projected image and again adjusting the knob until the spot disappears, will automatically indicate the density range of the negative.

6. A photographic exposure meter, comprising a casing, a source of illumination in the casing, a combined visual reflected and transmitted light comparison field in the casing, said light comparison field including a translucent plate, means for varying the amount of illumination reaching the under-face of the plate, a knob rotatably mounted in the casing and removed from the comparison field, said knob adapted for operating said illumination varying means, a pair of calibrated scales on the outer cover of the casing concentric with the knob, a pointer associated with the scales and moved by the knob, at least one of said scales being rotatable with regard to the other and with regard to the casing, one scale being graduated in terms of photographic paper and the other scale being logarithmically graduated in exposure times.

7. A photographic exposure meter comprising a casing, a source of illumination in the casing, a combined visual reflected and transmitted light comparison field in the casing, said light comparison field including a translucent plate, means for varying the amount of illumination reaching the under-face of the plate, a knob for operating said illumination varying means, a pointer on the knob, and a set of calibrated scales on the outer cover of the casing concentric with the knob and over which the pointer is moved by the knob, two of said scales graduated in terms of paper quality and another scale graduated in exposure times.

8. A photographic light meter for enlarging work comprising a casing, a source of illumination in the casing, a combined visual reflected and transmitted light comparison field in the casing, said light comparison field including a translucent plate and a reflecting area, means for varying the amount of light reaching the comparison field from the source of illumination, a knob rotatably mounted on the casing at a point removed from the comparison field for operating said illumination varying means, an indicating element movable with the knob, a set of ring-like calibrated scales on the casing cooperating with the knob, one of said scales logarithmically graduated in time units and another scale graduated in terms of photographic paper speed whereby a preliminary selection of a notation on at least one of the scales in accordance with the paper used and a later adjustment of the knob to vary the amount of light falling on the comparison field and balance the same with the light coming through a negative to be enlarged will automatically indicate on the logarithmic scale the exposure time for paper of a given speed.

FELIX LEWIN.